Nov. 3, 1959 B. ROTA 2,910,928
AUTOMATIC MACHINE FOR PREPARING COFFEE DRINK
Filed June 24, 1958 6 Sheets-Sheet 4

Fig. 4

Nov. 3, 1959 B. ROTA 2,910,928
AUTOMATIC MACHINE FOR PREPARING COFFEE DRINK
Filed June 24, 1958 6 Sheets-Sheet 5

United States Patent Office 2,910,928
Patented Nov. 3, 1959

2,910,928

AUTOMATIC MACHINE FOR PREPARING COFFEE DRINK

Beniamino Rota, Brandizzo, Italy

Application June 24, 1958, Serial No. 744,198

Claims priority, application Italy June 27, 1957

17 Claims. (Cl. 99—289)

This invention relates to a cyclic automatic machine for preparing coffee drink, having the characteristic feature that the machine comprises a stationary frame, a unit capable of rotation within the frame, strainer holding cups mounted on the rotary unit, means for controlling rotation of the unit holder for the cups securedly fixed to the unit, means for loading empty cups on the cup holder and discharging cups filled with coffee drink therefrom, movable means for closing the strainer cups, means for supplying to the strainers coffee powder, hot water under pressure and compressed air for driving the liquid and drying the exhausted coffee powder, means for discharging from the strainers the exhausted powder and an automatic control for said means.

Further characteristic features of this invention will be understood from the appended description referring to the accompanying drawings given by way of a non-limiting example, wherein.

The automatic machine for preparing coffee drink is supported by a frame comprising a disc-shaped foundation 1 having an annular flange 1a bent upwardly to which a casing 3 is secured by means of screws 2. The casing has rotatably mounted therein a unit comprising a plurality of coffee brewing sets carried by a disc 4 keyed to a shaft 5 mounted on a radial thrust bearing 6 having a double row of balls fitted in a support 7 which is secured by means of screws 8 to the casing 3.

The disc 4 has attached thereto by means of screws 10 cup-holders, one cup-holder being provided for each set, each cup holder comprising a U-shaped strap 9b having a lower leg 9a on which the cups are placed. Radial blades 11 extend upwardly from the leg for laterally locating the cup.

Figure 1:
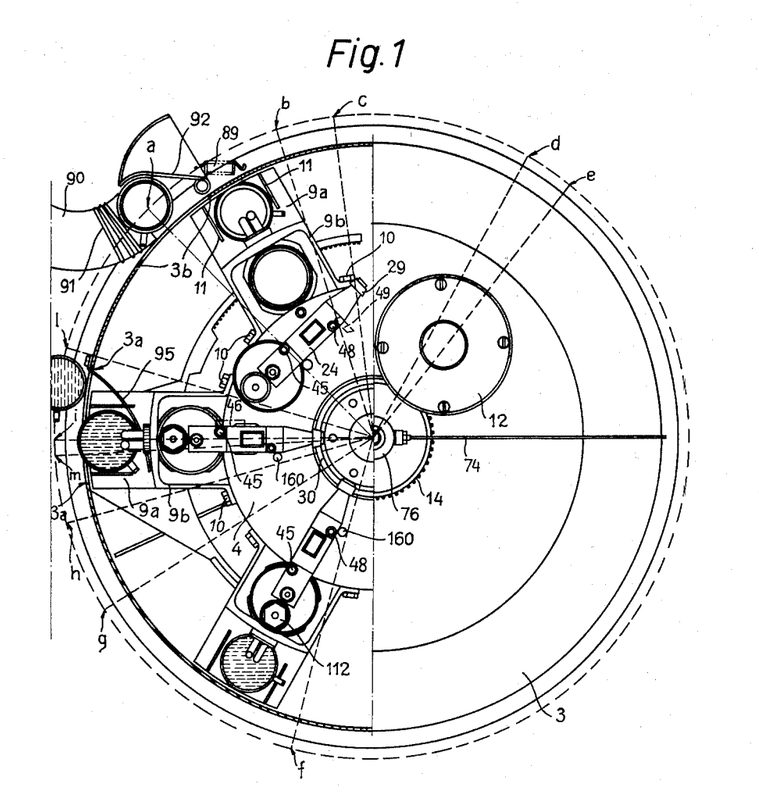
Figure 1 is a plan view of the machine, the outer frame being partly shown in section.

The casing is formed with an opening, the sides of which are denoted by 3a (Figure 1) for removing from the cup-holders 9 the cups filled with coffee drink, and with an opening, the sides of which are denoted by 3b, through which empty cups are placed on the cup-holder 9 for receiving the coffee drink.

The disc is continuously rotated by a motor 12 driving, through a reducing gear set indicated as a whole by 13, a toothed wheel 14 keyed to the disc shaft.

The motor is energised, as described more fully hereafter, by means of an automatic control device generally denoted by 15, which further causes the devices incorporated by the machine to perform all the necessary operations for producing the coffee drink.

The coffee brewing sets, six in number in the construction shown, comprise head portions each carrying two strainer-holding cups, the said head portions being movable between two positions in one of which one of the strainer cups is at the top, the other strainer cup being beneath the head portion, and a further position rotated through 180° to the former, the machine further comprising means for rotating each head portion on every revolution of the unit.

Figure 3:
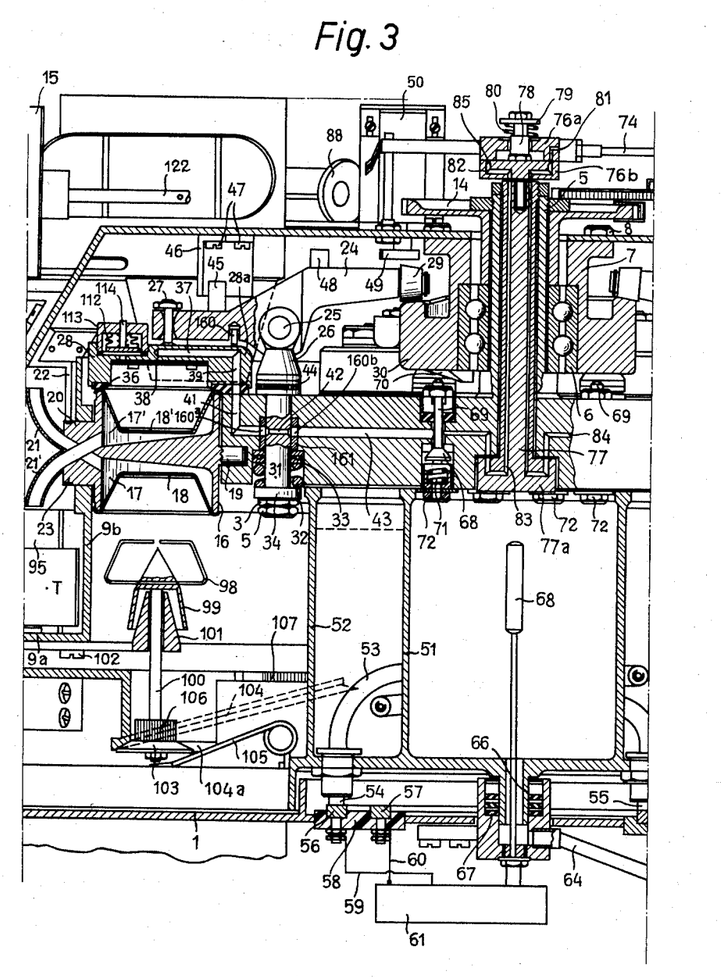
Figure 3 is a detail view of Figure 2 on an enlarged scale.

Referring more particularly to Figure 3, each head portion comprises a casing 16 having recesses or cups 17, 17' opening on opposite faces thereof. The opening of each cup is formed with seats for strainers 18, 18' adapted to be filled with coffee powder. The casing 16 is provided with pins 19, 20 extending from opposite faces thereof fitting into holes bored in the outer periphery of the disc 4 and strap 9b on the cup-holder, respectively.

The cups each connect with a tube 21, 21', for discharging the coffee drink into the cups T.

The above mentioned means for reversing the position of the cups on each head portion on every revolution of the unit comprises a toothed sector 22 secured to the casing 3 and meshing with a toothed pinion 23 securedly fixed to the casing 16 over a certain angular movement of the unit. The length of the toothed sector 22 and diameter of the pinion 23 are such that the casing 16 is rotated through 180° on each revolution of the unit.

Each set further comprises means for closing and locking its strainer cup situated at the top during the step of the cycle at which the coffee drink is produced, when the said cup has been prepared for operation in the manner to be described hereafter.

The closing and locking means comprises a beam 24 pivoted at 25 to a support 26. The beam 24 carries at one end, by means of a bolt 27 with a clearance, a cover 28 which is kept against rotation by a tooth 160. The beam has mounted at its other end a conical roller 29 cooperating with an annular cam 30 integral with the stationary support 7 for the shaft of the disc 4.

The cam is adapted to fit the cover 28 on its respective cups situated in the top position when the cup has been prepared for operation, the cover being fitted on the cup during the step at which the coffee drink is brewed.

The support 26 having a beam pivoted thereto is movable with respect to the disc between a position in which the cover overlies the top cups and the beam cooperates with the cam, and a further position in which the cover is removed from the cup and the beam is removed from the cam.

The support is conveniently pivoted to the disc by means of a pin 31 integral therewith, rotatable in a stationary sealing packing 161 made of suitable material known per se accommodated by a hole bored in the disc.

A strong helical compression spring 42 is threaded on the pivot 31 and rests at one end against a thrust bearing 33 accommodated by a recess in the disc and at its other end against a washer 34 bearing against adjusting nuts 35.

A sealing packing 36 is interposed between the cover 28 and head portion 16.

The cover 28 is provided on its side near the axis of the disc 4 with an extension 28a in which a conduit 29 is bored connecting with a conduit 37 radially bored in the cover and opening into a nozzle 38 overlying a shower 40.

The conduit 39 connects through a hole bored in the packing 36 with a cranked conduit 41 bored in the disc 4 and opening into a hole in the packing 161 registering with a cross hole 42 bored in the pin 31 fast with the support 26. The hole 42 registers with the hole in the packing 161 in the close position of its respective cover. The packing 161 is formed with a further hole 161a connecting with a conduit 43 radially bored in the disc 4. Hot water under pressure and thereafter compressed air are fed through the conduit 43, hole 161b, hole 42, hole 161a, conduit 41, conduit 39, conduit 37 and nozzle 38 to every filter situated in the top position, in the manner to be described hereafter during the drink brewing step.

As mentioned above, every beam is pivoted about an axis arranged orthogonally of the disc axis. Moreover, the pivot 25 carried by the support 26 is rotatable together with the pin 31 about an axis parallel with the disc. This further rotation permits of the cover 28 fully uncovering the mouth of the strainer in the top position to permit rotation of the head portion through 180°.

Rotation of the beam 24 about a vertical axis is effected after the cam 30 has released the cover 28.

The means for rotating every beam 24 about a vertical axis comprises a push rod 45 fast with the arm cooperating with a stationary stop 46. By effect of the rotation of the unit the beam 24 reaches the position denoted by 24′ in Figure 1, in which the mouth of its respective strainer is uncovered, the roller 29 being removed from the cam 30.

The means for returning the beam 24 to its position in which the cover 28 fits on its respective strainer and the roller 29 cooperates with the cam 30, comprises a stop 48 fast with the arm 24 and cooperating with a stop 49.

The machine is of such construction as to permit preparing for operation any given number of sets on each operating cycle. Therefore, the stop 49 can be moved at will by hand onto the path of the stop 48 in order to return to their operative position the beams 24 only associated with a set prepared for operation.

The stop 49 is therefore fast with the armature of an electromagnet 50 which is energized through the automatic control device 15 previously mentioned.

The disc 4 has moreover secured thereto stops 160, one stop being provided for each beam 24, the beam abutting said stops in its operative position.

The means for producing and feeding hot water under pressure to the operative strainers shall now be described.

Said means comprises a boiler 51 secured to the disc 4 beneath the latter and surrounded by a vessel 52 containing oil or other heat transfer liquid.

The vessel 52 comprises a cylindrical casing encircling the boiler 51. 53 denotes an armoured resistance for heating the oil in the vessel 52, the ends of the resistance being connected with the brushes 54 and 55 cooperating with contact rings 56, 57 respectively, carried by a base 58 of insulating material fast with the base disc 1.

The current supply rings 56, 57 are connected through wires 59, 60, respectively, to a thermostatic control device 61.

The vessel 52 connects with the atmospheric pressure through a hole 62 bored in the disc 4 acting to check the oil level and fill in any further oil after a given period of operation, such as 3 or 4 months. Water is fed to the boiler 51 through a pump 63 of a type known per se through a tube 64 opening into a sump 65 fast with the base 1 and having dipping therein a tubular extension 66 projecting from the bottom of the boiler 51. Sealing between the tubular extension 66 and inner walls of the sump is afforded by synthetic rubber packings 67.

A pressure of about 2 atmospheres is maintained in the boiler 51 by means of an electric pump 63 equipped with a by-pass valve of a type known per se (not shown on the drawing).

The water temperature in the boiler 51 is kept constant at a value slightly exceeding 100°, such as 110° C., by means of a thermostat 68 extending within the boiler 51 through the hole in the tubular extension 66 and connected with a control device 61.

Since the steam pressure at the temperature of 110° C. corresponds to 0.6 atmosphere gage, no steam cushion would be formed in the boiler.

Interconnection of the boiler 51 and the conduits 43 supplying hot water to the individual filters is effected through a valve, the valve member 68 of which is actuated through a push rod 69 by a stationary cam 70. A spring 71 enclosed within a bored plug 72 screwed into a seat provided in the disc 4, pushes the valve member 68 upwardly to its closed position. As mentioned above, the individual strainer cups receive, on ceasing of hot pressure water supply, compressed air for drying the exhausted coffee powder by the means to be described hereafter. Said means comprises an air compressor 73 driven together with a pump 63 by a motor 75 and feeding through a tube 74 a distributor 76 comprising a stationary top portion 76a and a movable lower portion 76b together with the pivot 5.

The lower portion 76b is secured to the end of the rod 77 arranged within the hollow shaft 51 by means of a screw 78 having a cylindrical portion acting as a rotational pivot for the movable portion 76a.

A spring 8 bears through a washer 79 against the head of the screw 78 and is adapted to press the stationary portion 76a of the distributor against the movable portion 76b.

Through-conduits 82 are bored in the movable distributor portion and connected with axial conduits 83 bored in the rod 77. The conduits 83 extend into a head portion 77a on the lower end of the rod 77 and each connect with one of the conduits 43 bored in the disc 4.

Compressed air fed to the strainers therefore follows over a portion of its path, more particularly through the conduits 43, 41, 39, 37 and nozzle 38, the path followed by hot pressure water. Compressed air fully evacuates the water from the conduit and exerts a thrust on the surface of the water over the coffee powder in the strainer. As the water flow ceases, air further flows through the filter for drying the exhausted coffee powder.

The flow rate of air to be fed to the individual strainers is limited by means of capillary holes 85 bored in the mouth of the conduits 82.

As mentioned above, the machine further comprises means for feeding coffee powder to the strainers on the sets prepared for operation. The said means comprises a coffee grinder of a type known per se, provided with a measuring device 86, likewise of a type known per se, driven by a motor 87 and an intercepting valve (not shown on the drawing) actuated by an electromagnet 88 from the automatic control device 15.

The machine further comprises charging means for placing empty cups on the supports therefor, as well as discharging means for withdrawing filled cups from the supports.

Figure 4:
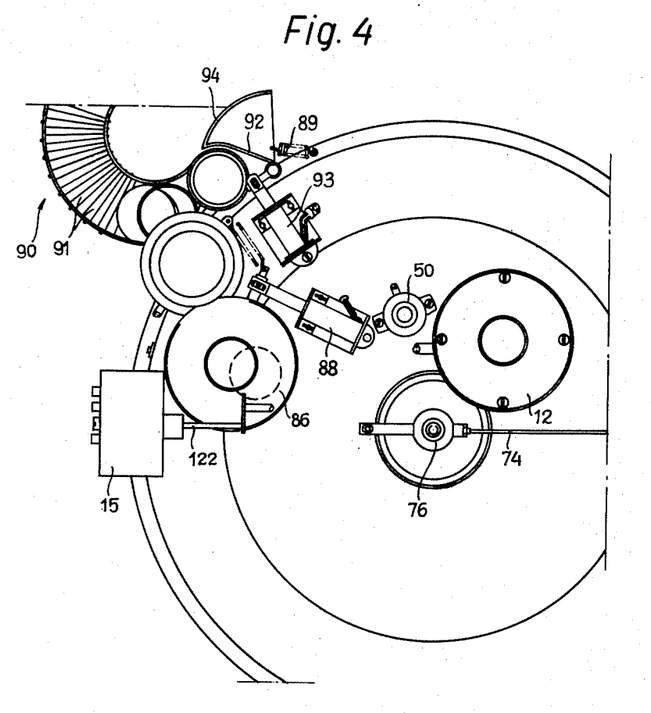
Figure 4 is a fragmentary plan view of the machine.
Figure 5:
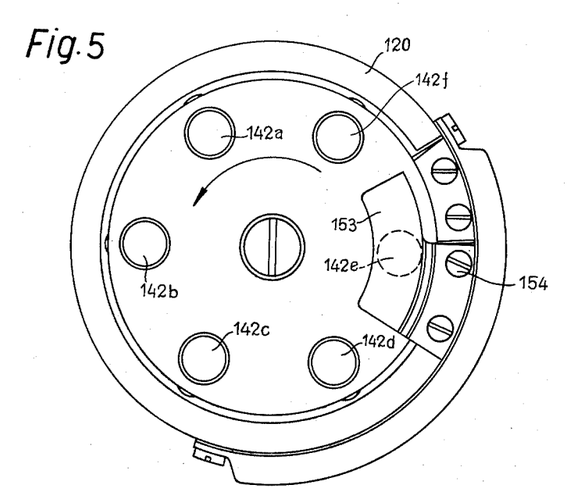
Figure 5 is a front view of the automatic control device.
Figure 6:
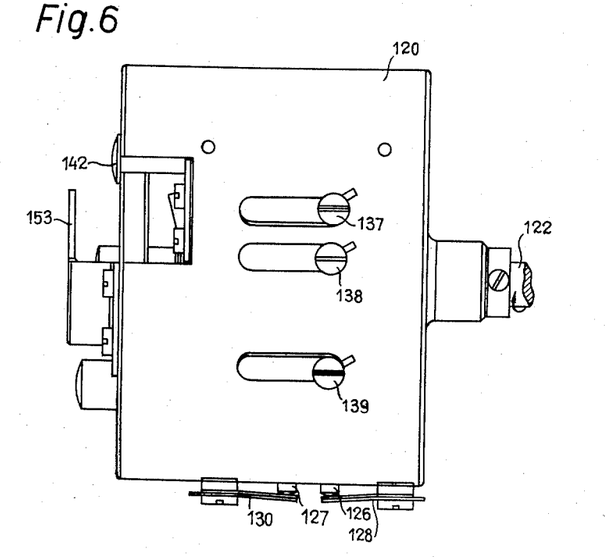
Figure 6 is a side view of Figure 5.
Figure 7:
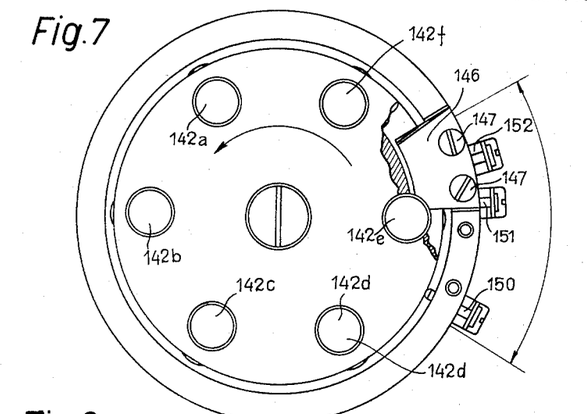
Figure 7 is a part sectional front view of the automatic control device for the machine.
Figure 8:
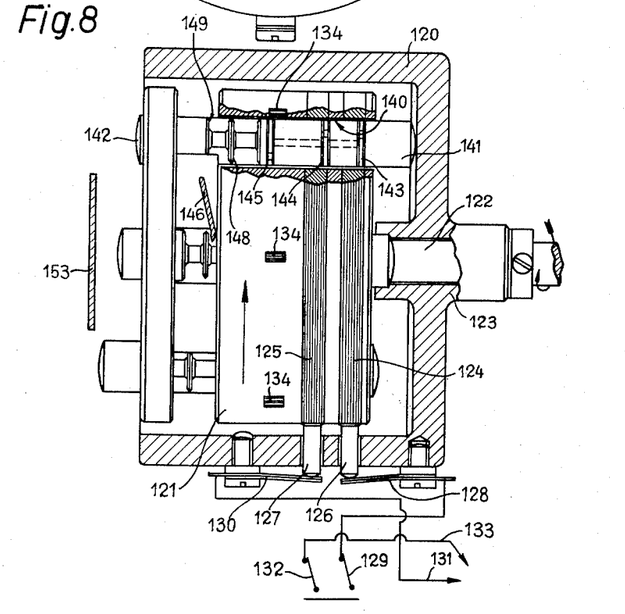
Figure 8 is an axial sectional view of the automatic control device for the machine.

The means for charging empty cups on the support comprises a charger 90 in form of a chute of helical shape arranged with a vertical axis adapted to receive a supply of empty cups which, by virtue of their own weight, slide down along the chute and are gradually taken at the lower end. In order to facilitate sliding of the cups along the chute, the latter is provided with small rotatable conical rollers 91. The cups are taken at the lower end of the chute by means of a rocking sector 92, actuated by an electromagnet 93 against the action of a spring 89 (compare Figure 4). The rocking sector 92 is provided at one end with a stop 94 adapted to retain the pile of cups during filling of the lowest cup.

The electromagnet 93 is actuated by the automatic control device at the suitable moment with a view to filling the cup for each of the sets prepared per operation.

The discharging device (Figure 1) merely comprises a blade 95 secured to the casing 3 situated on the path of the cups so as to cause the latter to slide outwardly through the opening 3a.

Each full cup leaving its respective support is therefore pushed on to the surface of the bench 96 on which the machine rests by means of a flange 97 coextensive with the bench 96.

On account of the cylindrical shape of the cups, the latter, even on abutting further cups filled with coffee, removed from the previous sets, are stored without any danger of upturning or spilling until the attendant removes them for serving the clients.

As mentioned above, the machine further comprises means for discharging exhausted coffee powder. The said means comprises on each set a scraper 98 comprising a wire substantially equalling in shape the profile of the strainer, mounted on a support 99 keyed to the shaft 100. The shaft is capable of rotation and vertical displacement in a support 101 secured by means of screws 102 to the cupholder 9.

The shaft 100 has keyed to its lower end a bevel wheel 103 adapted to cooperate with a stationary cam 104 under the action of a hair pin spring 105 secured to the base of the vessel 52.

Figure 2:
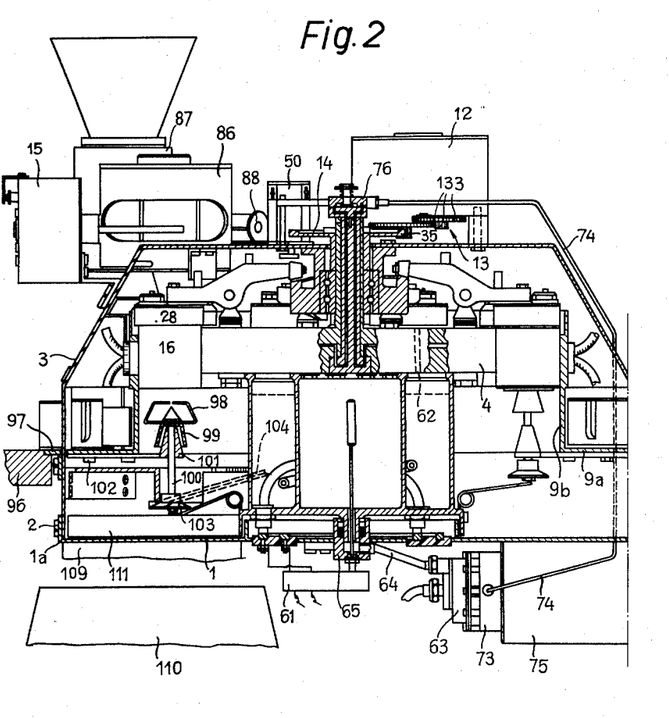
Figure 2 is an axial sectional view of the machine along the axis of the rotary unit.

The bevel wheel 103 is normally lifted (compare the right-hand portion of Figure 2) under the action of a spring 105. In good time before the cup is released by lifting of the cover 28, the bevel wheel 103 abuts a cam comprising a helical portion 104 (denoted by dash lines in Figure 3, in which it would normally not be visible) and an arcuate portion 104a, the first mentioned portion causing the bevel wheel 103 to sink in order to remove the scraper 98 from its respective strainer 18 and permit rotation of the head portion 16. As the head portion completes it rotation, the portion 104a of the cam is sharply cut away, the bevel wheel being caused by the hair pin spring 105 to move upward together with a toothed pinion 106 which meshes with a toothed sector 107. In this manner, the scraper 98 is lifted, introduced into its respective strainer and rotated to remove the dry exhausted coffee powder.

The exhausted coffee powder removed from the strainers falls onto the lower portion of the machine frame and issues through a wide slot 109 and is collected by a tray 110.

In order to collect the exhausted coffee powder, blade 111 rotating with the unit is arranged on the lower annular base of the machine and collects the exhausted coffee powder wherever it is situated and conveys it to the collector tray.

According to a further characteristic feature of this invention, each set is provided with a device responsive to the pressure within the operative strainer in order to stop the driving motor rotating the unit when the pressure within the strainer has not sunk to zero on completion of the brewing step.

The pressure responsive device comprises a capsule 121 enclosed by a casing 113 acting on a push rod 114 adapted to co-operate with a switch (not shown on the drawing) connected in the supply circuit for the motor 12 controlling the unit in order to arrest the latter should a certain pressure still prevail in the strainer before release of the cover 28. As soon as this pressure is annulled, the switch is again closed and the motor 12 can be restarted.

The purpose of this device is to insure full drying of the strainer in order to avoid escape of exhausted coffee powder on the release, as might objectionably affect operation of the machine.

The machine operates as follows:

On starting of the cycle, the rotary unit is started and all operations are performed as the machine is in movement, the machine performing one revolution during about one minute and a half. The cycle starts by dropping of the coffee powder into the strainer under the coffee grinder, more particularly at the region denoted by 1 in Fig. 1. Thereafter, the rocking sector 92 places at the region a a cup on the cup holder, the strainer being closed. At the region b, the strainer cover 28 is locked through the action of the cam 20 on the conical roller 29.

Upon a further rotation through about 10° of the rotary unit, more particularly at the region c, the hot water delivery valve 68 to the strainer is opened through the action of the cam 70 on the push rod 69. Supply of water is continued to the region d, in which the cam profile is raised, the valve member 68 reclosing under the action of the spring 71.

As a result of the configuration of the air distributor 76a, 76b, at the region e compressed air is delivered to implement the water thrust through the coffee powder. Supply of compressed air continues through an angle of about 200° to the region f. From the region f to the region g, the pressure in the strainer gradually decreases owing to the air flow through the compressed exhausted coffee powder. At the region g to h, the capsule 112 checks whether the pressure has been annulled. Should this not be the case, the capsule stops the motor 12 only driving the rotary unit.

At the region m, release of the beam 24 and rotation of the head portion starts. On completion of this rotation, the cycle can be restarted at the region 1 by filling in fresh coffee powder. The cup filled with coffee drink has been removed in the meantime at the region i.

As mentioned above, the automatic control device for the machine to be described hereafter comprises manual preparing members, one member being provided for each set, in order to prepare for operation the various machine sets, and electrical means actuated by the said preparing sets for causing the machine to perform the necessary operations for brewing the coffee drink through the prepared sets.

The electrical means act on the electromagnet 88 to supply a measured quantity of coffee powder, on the electric coil 93 to place an empty cup by means of the rocking sector 92 and on the electric coil 50 to close the cups for the sets prepared for operation.

Consequently, no coffee powder is filled into the strainers of the sets that have not been prepared by operation upon opening of the cups and no cup is fed to the set, its respective beam being kept against rotation for locking, so that the set does not receive either water or air, the conduit 42 being closed.

The automatic control device for the machine shown in Figures 5 to 8 shall now be described.

The device comprises a hollow cylindrical casing 120 of dielectric material in which a rotor drum 121 is rotatable, the said rotor being likewise made of dielectric material and being mounted on a shaft 122 rotatable in a support 123 provided on the casing 120.

The shaft 122 receives motion from the toothed wheel 14 through means not shown and performs one revolution on each turn of the unit.

Rings 124, 125 of electric conducting material are mounted on the rotor 121 made of dielectric material and co-operate with brushes 126, 127, respectively. The brush 126 is connected by a resilient plate 128 to one end 129 of the supply line; the brush 127 is connected through a plate 130 to a lead 131 connected with the remote control switch winding controlling the motor 12 as well as the motor for the air and water pump. The other end of the said winding is connected to the terminal 132 of the voltage supply lead 133. The remote control switches for the motors 12 and 75 are shown on the drawings.

Contacts 134 in form of short segments, each associated with each set extend from the periphery of the drum 121 and co-operate with brushes 150, 151 and 152 connected with terminals 137, 138 and 139, respectively.

The three terminals are each connected with one end of the energizing windings of the electromagnets 88, 93 and 50, respectively, the other end of the energizing winding for the said electromagnets being connected with a terminal 132 for the supply through conductors not shown on the drawing.

Axial seatings 140 are provided in the rotor 121 of the automatic control device for preparing members 142 actuated through push buttons. One setting member 142 is associated with each machine group. In the embodiment shown the setting members are six in number, namely 142a, 142b, 142c, 142d, 142e and 142f.

The setting members 142 are made of dielectric material and formed with grooves in their periphery receiving split metal rings 143, 144 and 145 electrically interconnected and adapted to contact at given positions of the respective setting member metal rings 124, 125 and the respective contact 134. The setting members 142 each can occupy one of three positions, more particularly a withdrawn position shown in connection with the top member in Figure 8, an intermediate position shown in connection with the intermediate setting member, and an extracted position shown in connection with the lower member.

In the fully withdrawn position, the rings 143 and 144 switch on the remote control switch for the motors 12 and 75, whereby these motors are energised. Moreover, the ring 145 likewise electrically connected with the rings 143, 144 supplies voltage to the contact 134 which successively energizes the electromagnets 88, 93 and 50 for causing coffee powder to fall onto the strainer of the set with which this setting member 142 is associated, thereupon feeding an empty cup to said set and moving the stop 49 to its operative position for closing the strainer.

A return member extends from the inner surface of the casing 120 of the control device and comprises a plate 146 secured by means of screws 147. The plate rests on a helical surface concentrical with the rotor and cooperates with the surfaces 148 and 149 of grooves cut in each of the setting members 142 for extracting the said members by two steps. The plate 146 is shaped to effect a first displacement of the setting members 141 from their fully withdrawn position in order to remove the metal ring 145 from its respective contact 134, however leaving the rings 143 and 144 in contact with the collector rings 124, 125, respectively, and a further displacement on the next revolution in order to remove the above mentioned rings 143 and 144 from the rings 124 and 125 also.

The reason for this arrangement is as follows. When any of the setting members is thoroughly depressed to the position shown at the top of Figure 8, this member through its contact 134 should subsequentially contact the three brushes 150, 151 and 152 in order to perform the necessary operations on its respective set. After the contact 134 has subsequentially contacted the three brushes, 150, 151 and 152, it is moved by the plate 146 to keep the split ring 145 from contacting the contact 134. However, the unit should perform a further rotation to complete the cycle. Upon performing this rotation, the plate 146 further moves the setting member 142 and, if no further setting member is depressed, the motors 12 and 75 stop and arrest the machine.

In order to restart the machine the operator should depress anyone or more push-buttons with a view to ordering one or more coffee cups to the machine.

It will be obvious that means (not shown on the drawing) can be provided for automatically lowering again any setting member as soon as it is pushed outwardly in order to prepare coffee drink continuously.

The casing has secured thereto by means of screws 155 a plate 153 adapted to conceal the push buttons 142 moving over the sector covered by the said plate. The plate is intended to prevent depressing of the push-button on the said sector so that, unless supply of coffee powder is operated, no further operations can take place.

It will be seen that the above described control device permits continuous brewing of coffee cups or intermittent brewing of the desired number of cups.

It will be understood that, the principle of the invention being left unaltered, embodiments and constructional details can be widely varied with respect to the nonlimiting example described without departing from the scope of this invention.

What I claim is:

1. Automatic machine for preparing coffee drink in cups, wherein the machine comprises a stationary frame, a disc mounted for rotation on the frame, a plurality of head portions mounted on the disc, each carrying two strainer-cups namely a top and a bottom cup, means for reversing the position of the two cups on each head on each revolution of the disc, means for controlling rotation of the disc, cup holders fast with the disc, means for charging on the holders empty cups and discharging therefrom cups filled with coffee drink, movable means for closing the strainers in their top position, means for supplying to the strainers ground coffee, hot water under pressure and compressed air for drying the exhausted coffee powder, means for discharging exhausted coffee powder from the strainers and an automatic control device for the said means.

2. Machine as claimed in claim 1, wherein each head comprises a body portion formed with two recesses opening on opposite faces thereof, seats for the strainers formed at the mouth of each of said recesses and conduits for discharging the coffee drink from the two cups so arranged that the conduit for discharging the coffee drink from the top cup depends downwardly.

3. Machine as claimed in claim 1, comprising for each individual head a shaft rotatable in a support carried by the disc, said shaft being arranged below the head coaxially with the strainers carried by the head and being displaceable in vertical direction towards and away of said head, a scraper at the upper end of said shaft, said scraper having the form of a wire loop shaped to equal the profile of the axial section of the strainers carried by said head, a bevel wheel fast with the lower shaft end, a pinion keyed to the shaft immediately above said bevel wheel and having a diameter smaller than that of the latter, a spring secured to the machine frame and acting upon the lower end of the shaft for urging it in upward direction to bring said scraper into contact with the inner wall of the strainer carried by the reversed cup of said head, an arc-shaped toothed sector for cooperating with said pinion, said sector being secured to the machine frame and arranged to obtain its engagement with said pinion and the rotation of said shaft and scraper as the shaft is lifted and the scraper is into contact with the inner wall of the strainer of the reversed cup of the head, an arc-shaped cam secured to the machine frame for acting on said bevel wheel fast to the lower end of said shaft and for lowering it together with said scraper and extracting the latter out from the strainer carried by the reversed cup, before the head begins its rotation, said cam cut away at a point such that said shaft and scraper are lifted again after said head has accomplished its rotation and before said pinion is brought to an angular position with respect to the machine frame at which it can engage, when lifted, said toothed sector.

4. Machine as claimed in claim 1, comprising a first electromagnet for actuating, when energized, said means for supplying to the strainers ground coffee, a second electromagnet actuating, when energized, said means for charging on the holders empty cups and a third electromagnet for actuating when energized said means for closing the strainers in their top position, a cylindrical casing open at one end and fast with the machine frame a rotor mounted rotatable within said casing and driven by the means for rotating said disc at the same rate as the latter, cylindrical push buttons one for each head slidable in cylindrical seats provided in the rotor and uniformly distributed around the axis of the rotor and parallel with said axis, said casing, rotor and push buttons being of electrically non-conductive material, a remote control switch for actuating when energized said means for rotating the disc, for supplying hot water under pressure and compressed air, rings axially spaced of electric conductive material on the outer surface of the rotor, a pair of brushes carried by said casing and constantly contacting with said rings on the rotor, an electric current supply line, a main switch on said line, one of said brushes being connected to one terminal of said main switch, the other brush being connected to the other terminal of said main switch through said remote control switch, a set of contacts in form of segments one for each head carried by the rotor, said segments being arranged in circle at equal intervals and displaced from said rings on the rotor towards the casing opening, each contact facing the rotor outer periphery and the inner periphery of the seat for one of said push buttons three brushes for cooperating with said contacts carried by said casing, said brushes being connected to said other terminal of the main switch through said first, second and respectively third electromagnet, three axially spaced interconnected rings of electrically conductive material on the periphery of each push button for cooperating with said rings and said contacts on the rotor, a pair of grooves on each button arranged near their ends projecting from said casing, a helically shaped blade of limited circumferential dimension carried inside said casing and projecting towards said grooves when they are out of the seats for the push buttons provided in the rotor, each button being arranged to be displaced between three positions, a first position in which it is fully depressed and its rings connect the rotor rings therebetween, thereby energizing said remote control switch for actuating said means for rotating the disc and said rotor carrying the push buttons, the means for feeding the hot water under pressure and compressed air, and the contact associated with the seat of the depressed push button with said terminal of said main switch, thereby allowing the successive energization of said electromagnets upon rotation of the disc carrying said heads and of the rotor, a second position at which two of its rings still connect said rings on the rotor but its third ring is always out of contact with the contact on the rotor associated with said seat for the push button, thereby maintaining the disc and the rotor in rotation, and a third fully extracted position when its rings are always out of contact with said rotor rings and the contact associated with its seat, said helically shaped blade and said grooves on each push button being so arranged and shaped as to engage each other and automatically bring the push button from its first position towards its second position after the successive energization of said electromagnets upon rotation of the rotor and then from said second to said third or rest position after a further revolution of the rotor.

5. Machine as claimed in claim 1, wherein the heads carrying the cups are mounted for rotation about axes radially arranged with respect to the rotary unit.

6. Machine as claimed in claim 5, wherein the means for reversing the position of the strainers on each head comprises a toothed sector fast with the frame and toothed pinions each associated with one head portion fast with said head portions and co-operating with said sector.

7. Machine as claimed in claim 1, wherein the closing means for each strainer comprises a beam a cover carried by one beam end adapted to co-operate with the strainer for closing the latter during the coffee drink brewing step, a cam fast with the machine frame co-operating with the other beam end for fitting the cover to the strainer during said coffee brewing step, a support to which the beam is pivoted, said support being movable with respect to the disc to a position in which the cover co-operates with the strainer and the beam co-operates with the cam, and a further position in which the cover is removed from the strainer and the beam is removed from the cam, and means for causing the beam support to perform said movements.

8. Machine as claimed in claim 7, wherein the support is pivoted to the disc and the means for moving the beam comprises a first and a second stop arranged on the beam path co-operating with the latter, the first mentioned stop being adapted to rotate the support from its first to its second position before filling the coffee powder into the strainer, the second stop being adapted to reversely rotate the said support upon filling in of the coffee powder.

9. Machine as claimed in claim 1, wherein the means for supplying hot water under pressure to the strainer comprises a boiler mounted on the disc for rotation therewith, electric resistors for heating water in the boiler, a pump for supplying pressure water to the boiler, conduits connecting the boiler with the individual heads carrying the cups, a shut-off valve interposed in each of said conduits and valve control means.

10. Machine as claimed in claim 9, wherein each shut-off valve is operated by a cam fast with the machine frame having co-operating therewith a push rod acting on the valve member.

11. Machine as claimed in claim 9, wherein the water supply conduits to the individual head portions are bored part in the disc and part in the covers of the individual head portions through which they open into the strainers, the conduit portion bored in each cover being co-extensive with the conduit portion bored in the disc and opening into the region of juxta-position of the cover on its respective head portion.

12. Machine as claimed in claim 9, wherein conduits for supplying compressed air to the individual heads are further provided, said conduits being each connected with one of said conduits connecting the boiler with said individual head at a point lying between said shut-off valve and the head, a tube connected to a source of compressed air including a compressor, and a distributor having a stationary portion connected to said tube and a movable portion rotatable with said disc and connected with said conduits for supplying compressed air to the individual heads, said distributor being shaped to supply compressed air to each individual head and to the cup after the supply of hot water to said head has ceased.

13. Machine as claimed in claim 11, wherein a cock is interposed in the supply conduit portion bored in the disc and is operated by the support for the beam for closure when the beam is in its opening position.

14. Machine as claimed in claim 13, wherein the cock comprises a plug which is constituted by the pivot for the support.

15. In an automatic coffee brewing and dispensing machine for dispensing coffee in cups comprising, a stationary frame, a rotatable, cyclically driven unit, cup supports fast with said unit, means for charging the supports with empty cups and discharging them when filled with coffee, a plurality of head portions on the rotary unit each comprising a pair of strainer-cups movable into a position with one strainer-cup upstanding and the other upside down with respect to the upstanding strainer-cup, each strainer-cup having a strainer therein for receiving ground coffee, means to automatically charge the strainer of the upstanding strainer-cup of each head portion with ground coffee during a portion of the cycle of rotation of said rotary unit, means to automatically subsequently flow sufficient heated water into each upstanding strainer-cup to brew the ground coffee, means to automatically apply air under pressure to the strainer of the upstanding strainer-cups, means to reverse the head portions at a proper time in the cycle of rotation of said unit to empty coffee from the upstanding strainer-cups thereof into corresponding cups to be filled on said supports, and means to carry on discharge of used ground coffee from the strainer-cups when emptied during the cycle of preparing strainer-cups positioned from an upside position to an upstanding position for a coffee brewing cycle.

16. In an automatic coffee brewing and dispensing machine for dispensing coffee in cups comprising, a stationary frame, a rotatable, cyclically, driven unit, cup supports fast with said unit means for charging the supports with empty cups and discharging them when filled with coffee, a plurality of head portions on the rotary unit each comprising a pair of strainer-cups movable into a position with one strainer-cup upstanding and the other upside down with respect to the upstanding strainer-cup, each strainer-cup having a strainer therein for receiving ground coffee, means to automatically charge the strainer of the upstanding strainer-cup of each head portion with ground coffee during a portion of the cycle of rotation of said rotary unit, means to automatically subsequently flow sufficient heated water into each upstanding strainer-cup to brew the ground coffee, means to automatically apply air under pressure to the strainer of the upstanding strainer-cups, means to reverse the head portions at a proper time in the cycle of rotation of said unit to empty coffee from the upstanding strainer-cups thereof into corresponding cups to be filled on said supports, and means to carry on discharge of used ground coffee from the strainer-cups when emptied during the cycle of preparing strainer-cups positioned from an upside position to an upstanding position for a coffee brewing cycle, and means to automatically sequence the various automatic means.

17. In an automatic coffee brewing and dispensing machine for dispensing coffee in cups comprising, a stationary frame, a rotatable, cyclically, driven unit, cup supports fast with said unit means for charging the supports with empty cups and discharging them when filled with coffee, a plurality of head portions on the rotary unit each comprising a pair of strainer-cups movable into a position with one strainer-cup upstanding and the other upside down with respect to the upstanding strainer-cup, each strainer-cup having a strainer therein for receiving ground coffee, means to automatically charge the strainer of the upstanding strainer-cup of each head portion with ground coffee during a portion of the cycle of rotation of said rotary unit, means to automatically subsequently flow sufficient heated water into each upstanding strainer-cup to brew the ground coffee, means to automatically apply air under pressure to the strainer of the upstanding strainer-cups, means to reverse the head portions at a proper time in the cycle of rotation of said unit to empty coffee from the upstanding strainer-cups thereof into corresponding cups to be filled on said supports, and means including means to apply air to the strainers of the upside down cups to dry out the ground coffee subsequent to emptying the coffee, to carrying on discharge of used ground coffee from the strainer-cups during the cycle of preparing strainer-cups positioned from an upside position to an upstanding position for a coffee brewing cycle.

References Cited in the file of this patent

UNITED STATES PATENTS

| | | |
|---|---|---|
| 1,467,778 | Paola | Sept. 11, 1923 |
| 2,014,325 | Grilli | Sept. 10, 1935 |
| 2,387,585 | Howard | Oct. 23, 1945 |
| 2,433,054 | Lime | Dec. 23, 1947 |
| 2,643,322 | Lime et al. | June 23, 1953 |
| 2,761,200 | Arnett | Sept. 4, 1956 |
| 2,827,927 | Findlay | Mar. 25, 1958 |

FOREIGN PATENTS

| | | |
|---|---|---|
| 542,825 | France | May 22, 1922 |